US009413158B2

(12) United States Patent
Koyama

(10) Patent No.: US 9,413,158 B2

(45) Date of Patent: Aug. 9, 2016

(54) PTC DEVICE

(75) Inventor: Hiroyuki Koyama, Narita (JP)

(73) Assignee: LITTELFUSE JAPAN G.K., Tokyo (JP)

( * ) Notice: Subject to any disclaimer, the term of this patent is extended or adjusted under 35 U.S.C. 154(b) by 119 days.

(21) Appl. No.: 14/115,080

(22) PCT Filed: May 1, 2012

(86) PCT No.: PCT/JP2012/061552

§ 371 (c)(1), (2), (4) Date: Jun. 12, 2014

(87) PCT Pub. No.: WO2012/150708

PCT Pub. Date: Nov. 8, 2012

(65) Prior Publication Data

US 2014/0293495 A1 Oct. 2, 2014

(30) Foreign Application Priority Data

May 2, 2011 (JP) ................................ 2011-103107
Sep. 9, 2011 (JP) ................................ 2011-197370

(51) Int. Cl.
*H02H 5/04* (2006.01)
*H02H 3/08* (2006.01)
(Continued)

(52) U.S. Cl.
CPC ............... *H02H 3/085* (2013.01); *H01C 1/142* (2013.01); *H01C 1/1406* (2013.01); *H01C 7/02* (2013.01); *H01M 2200/106* (2013.01)

(58) Field of Classification Search
CPC ........................................................ H02H 5/05
USPC ........................................................ 361/103
See application file for complete search history.

(56) References Cited

U.S. PATENT DOCUMENTS 5,907,272 A * 5/1999 McGuire .............. H01C 1/1406 337/153
6,392,528 B1 5/2002 Myong
(Continued)

FOREIGN PATENT DOCUMENTS

CN 1135570 C 1/2004
CN 1697092 A 4/2011
(Continued)

OTHER PUBLICATIONS

International Search Report for International Patent Application No. PCT/JP2012/061552 mailed Aug. 21, 2012.
(Continued)

*Primary Examiner* — Dharti Patel

(57) ABSTRACT

The present invention relates to a new PTC device having a configuration with which protrusion of solder paste and/or an excess portion of epoxy resin do not adversely affect a jig. Such PTC device 30 includes a PTC member 32 and leads 34 and 36 electrically connected to both sides of the PTC member. The PTC member includes a PTC element 38 and metal electrodes 40 and 42 placed on both sides of the PTC element respectively, and each lead is electrically connected to the metal electrode via an electrically conductive connection portion 50. At least one of the leads 36 has a concave portion which is defined with a bottom portion 44 located adjacently to the metal electrode of the PTC member and a wall portion 46 surrounding the electrically conductive connection portion which connects the leads to the metal electrode.

13 Claims, 3 Drawing Sheets

30 52 50 44 46 36 42 38 32 40 47 47 35 54 50 34 35

100 A 128 104 128 110 104 108 112 124 106 102 122

(51) Int. Cl.

| | |
|---|---|
| ***H01C 7/02*** | (2006.01) |
| ***H01C 1/14*** | (2006.01) |
| ***H01C 1/142*** | (2006.01) |

(56) References Cited

U.S. PATENT DOCUMENTS

| | | | | |
|---|---|---|---|---|
| 6,936,374 | B2 † | 8/2005 | Ehara | |
| 7,920,045 | B2 † | 4/2011 | Chandler | |
| 8,164,415 | B2 | 4/2012 | Tanaka et al. | |
| 2003/0026053 | A1 | 2/2003 | Toth et al. | |
| 2005/0062581 | A1 * | 3/2005 | Koyama | H01C 1/1406 338/22 R |
| 2006/0215342 | A1 | 9/2006 | Montoya et al. | |
| 2007/0057759 | A1 * | 3/2007 | Koyama | H01C 1/1406 338/22 R |
| 2009/0244811 | A1 | 10/2009 | Pascenko | |
| 2010/0013591 | A1 * | 1/2010 | Koyama | C22C 14/00 337/14 |
| 2011/0170221 | A1 * | 7/2011 | Koyama | H01C 7/028 361/93.8 |

FOREIGN PATENT DOCUMENTS

| | | | |
|---|---|---|---|
| JP | 2002-502554 | A | 1/2002 |
| JP | 2002-198206 | A | 7/2002 |
| JP | 2003-282306 | A | 10/2003 |
| JP | 2005-527100 | A | 9/2005 |
| JP | 2006-279045 | A | 10/2006 |
| JP | 2008177435 | A | 7/2008 |
| JP | 2009-239271 | A | 10/2009 |
| WO | 9856014 | A1 † | 12/1998 |
| WO | WO-2007/052790 | A1 | 5/2007 |

OTHER PUBLICATIONS

Search report accompanying First Office Action for Chinese Application No. 201280021003.2, dated Sep. 25, 2016.

* cited by examiner
† cited by third party

PTC DEVICE

FIELD OF THE INVENTION

The present invention relates to a PTC device which comprises a PTC (Positive Temperature Coefficient) member and leads which are connected to the both sides of the PTC member. In particular, the present invention relates to a PTC device which comprises a PTC member having a laminar polymer PTC element and metal electrodes placed on the both sides of the PTC element as well as leads which are electrically connected to the metal electrodes respectively.

BACKGROUND OF THE INVENTION

The above described PTC device is widely used as a protection device which protects an electric element (such as a secondary cell) constructing various electric apparatuses or a circuit constructing such electric apparatuses when an excessive amount of current passes through the apparatuses. Also, the PTC device is widely used as a protection device which interrupts a current flow through the apparatus when such electric element fails so that its temperature rises abnormally.

One example of such PTC device is shown in a schematic cross-sectional view in FIG. 1. A PTC device 10 comprises a PTC member 12 and leads 14 and 16 which are placed on the both sides of the PTC member. The illustrated PTC device 10 is located in, for example, a charge/discharge circuit of a secondary cell, and used as a circuit protection device to interrupt an excess current when such current passes through the circuit. In the illustrated embodiment, the lead 14 is electrically connected to a substrate which has a circuit protection circuit, while the lead 16 is electrically connected to a secondary cell side.

The PTC member 12 is composed of a PTC element 18 formed of an electrically conductive PTC composition and metal electrodes 20 and 22 which are placed on the both sides of the PTC element, and they are generally integrated by means of heat pressing.

The metal electrode 20 of the PTC member 12 is electrically connected to the substrate side lead 14 with solder paste which is sandwiched by the metal electrode 20 and the lead 14, and the metal electrode 22 is electrically connected to the cell side lead 16 via solder paste 24 which is sandwiched by the metal electrode 22 and the lead 16.

In order to produce such PTC device, the following is carried out for example: The solder paste 24 is placed on the substrate side lead 14, the PTC member 12 is place such that the metal electrode 20 is located on the solder paste 24, the solder paste 24 is place on the metal electrode 22, and the cell side lead 16 is placed on the solder paste so that an assembly of these members is formed. Thus formed assembly is passes through a reflow furnace so as to melt the solder paste followed by solidifying the molten solder paste by cooling, whereby the PTC device is obtained. In order that the assembly is passed through the reflow furnace, a jig having a plurality of concave portions is used. Each of the concave portions of the jig can receive and keep all the members superimposed in the above described order which form the assembly. The jig having a plurality of the assemblies formed by superimposing all the members in the concave portions is passed through the reflow furnace.

Such assemblies are passed through the reflow furnace to connect the members together via the solder, so that the PTC devices are obtained. Then, an oxygen barrier layer 26 is formed on the side of the PTC member. For such purpose, the obtained device is kept in other jig and an epoxy resin is applied onto the side of the PTC device to from a coating layer, followed by curing the layer to form the oxygen barrier coating 26.

International Patent Publication No. WO2007/052790 is a prior patent reference.

SUMMARY OF THE INVENTION

As to the above described connecting process, the assembly formed with the PTC member and the leads which are placed on the both sides of the PTC member via solder paste is located in the jig which keeps the assembly as it is, and such assembly is supplied to the reflow furnace. In the reflow furnace, the solder paste placed between the metal electrode and the lead is melted, and a portion of the solder paste protrudes out from between them and solidifies with being sandwiched between the assembly and a jig wall (In FIG. 1, the solder paste 28 which solidifies with protruding is schematically shown). As a result, it may become difficult to take the PTC device out of the jig. In addition, since a portion of the solder paste in a solid condition adheres to and remains in the jig. As a result, a need to clean the jig arises. Due to such matters, there is raised a problem of production efficiency reduction of the PTC device.

When the oxygen barrier layer 26 is formed, a similar problem is raised. That is, an excess amount of an epoxy resin located between the jig wall and a PTC device side is cured with adhering the jig wall. In this case, a need to clean the jig also arises. Due to such matters, there is raised a problem of production efficiency reduction of the PTC device.

Since the PTC device is used widely as a protection element as described above, it is required to produce the PTC device as efficiently as possible. Therefore, a problem to be solved by the present invention is to provide a new PTC device which solves at least one of the above mentioned problems as to the production of the PTC device. In other words, it resides in providing a new PTC device which has a structure with which the protrusion of the solder paste and/or the excess portion of the epoxy resin as described above does not affect the jig.

The present inventor has carried out extensive studies as to the protrusion of the solder paste and the excess portion of the epoxy resin as well as the structure of the PTC device, and found that the above mentioned problem is solved by forming a PTC device by using a lead having a structure in which a portion of the lead is located between the protruding solder paste and the jig wall, thus, achieved the present invention.

Thus, in the first aspect, the present invention provides a PTC device which comprises a PTC member and leads electrically connected to both sides of the PTC member, characterized in that the PTC member comprises a PTC element (preferably, a laminar PTC member) and metal electrodes (preferably, metal foil electrodes) placed on both sides of the PTC element respectively, each lead is electrically connected to the metal electrode respectively via an electrically conductive connection portion, and at least one of the leads has a concave portion which is defined with a bottom portion located adjacently to the metal electrode of the PTC member and a wall portion surrounding the electrically conductive connection portion which connects the lead to the metal electrode.

In a preferable embodiment, the PTC device according to the present invention, an exposed side portion of the PTC element which constructs the PTC member is covered with an oxygen barrier layer.

As the lead which has the concave portion as described above, for example the following may be used: a drawing processed lead which has been formed to have a depression portion by processing at least a portion of a flat metal plate with drawing processing; or a pressing processed lead which has been formed to have a depression portion by pressing at least a portion of a flat metal plate.

When the lead having the concave portion as described above is used, the wall portion which defines the concave portion, namely a portion which rises from the bottom portion and transversely (for example, vertically) with respect to the bottom portion, is located between a wall portion of a jig which is used in producing the PTC device and the PTC member. As a result, even though the solder paste protrudes from between the PTC member and the lead by being heated in the reflow furnace, the protruding solder paste portion contacts only the wall portion which defines the concave potion. Since the wall portion is located between the protruding solder paste portion and the jig, the protruding solder paste portion is prevented from further spreading outward to directly contact with the wall of the jig In addition, also when the oxygen barrier layer is formed, the wall portion of the concave portion is located between the wall of the jig and a side portion of the PTC device, particularly a side portion of the PTC device which portion is nearer to the lead, so that the likelihood of a portion of the epoxy resin to directly contact with the wall of the jig is greatly reduced.

In the second aspect, the present invention also provides various electric apparatuses such as a secondary cell which comprise the PTC device described above and below.

In the PTC device according to the present invention, since the lead having the concave portion is used, the protruding portion of the solder paste which appears upon the production of the PTC device is not substantially contacted with the wall of the jig for the production. As a result, the problem that the PTC device is not readily taken out of the jig, or the requirement that jig is cleaned so as to remove the protruding solder paste which adhering to the jig is substantially eliminated. As a result, the PTC device can be produced efficiently, which improves the productivity of the PTC device. In addition, when the oxygen barrier layer is formed, since contact of a portion of the epoxy resin with the jig wall is prevented as much as possible, the likelihood that an excess amount of the epoxy resin adheres to the jig is greatly reduced.

DETAILED DESCRIPTION OF THE INVENTION

Next, the PTC device according to the present invention will be explained in detail with reference to the accompanied drawings. A configuration of one embodiment of the PTC device according to the present invention is schematically shown in its cross-sectional view in FIG. 2 wherein one of the two leads has a concave portion. The illustrated PTC device can be used, for example, as a circuit protection device for a secondary cell.

Figure 1:
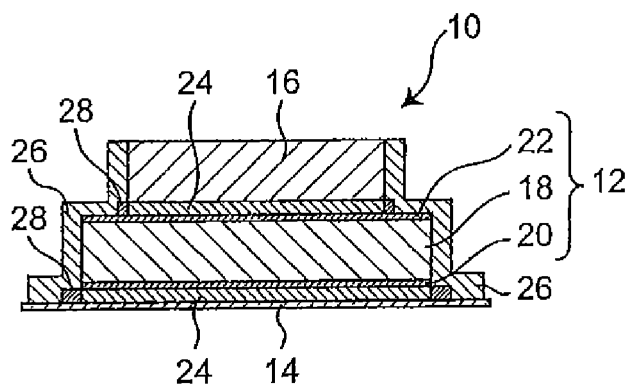
FIG. 1 schematically shows a configuration of the prior art PTC device in its cross-sectional view.

The PTC device 30 comprises a PTC member 32 and leads 34 and 36 which are electrically connected to the both sides of the PTC member respectively. In the illustrated embodiment, one lead 34 is, for example, a substrate side lead which is connected to a circuit board, and the other lead 36 is, for example, a cell side lead which is connected to a secondary cell. Similarly to the embodiment shown in FIG. 1, the PTC member 32 comprises a PTC element 38 in the form of a layer which is made of an electrically conductive PTC composition as well as metal electrodes 40 and 42 which are placed on the both sides of the PTC element respectively.

The metal electrodes 40 and 42 are adjacent to the leads 34 and 36, respectively, and they are electrically connected with each other by electrically conductive connection portions 50 between them. This electrically conductive connection portion may be any appropriate connection as long as it electrically connects between the electrode and the lead. For example, it represents a connection portion which is formed by a general material which is used for electrically connecting in the production of an electric apparatus, such as a solder, a solder paste (for example, a solder in which an epoxy resin is used as a flux), an electrically conductive adhesive or the like.

Figure 2:
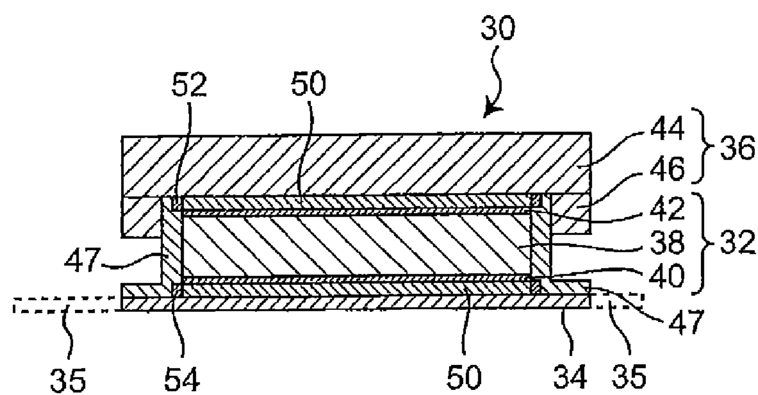
FIG. 2 schematically shows a configuration of one embodiment of a PTC device according to the present invention in its cross-sectional view.

In the illustrated embodiment, the cell side lead 36 of the PTC device 30 comprises a bottom portion 44 which is located adjacently to the metal electrode 42 of the PTC member and a wall portion 46 which surrounds a side portion of the electrically conductive connection portion which connects the lead 36 to the metal electrode 42, and the bottom portion 44 and the wall portion 46 define the concave portion. In FIG. 4, a perspective view of the lead 36 of the PTC device shown in FIG. 2 is schematically shown while inverting the lead upside down from the condition shown in FIG. 2. As illustrated, the lead 36 has the wall portion 46 which protrude upward from a periphery of the bottom portion 44, thereby the concave portion 48 which opens upwardly is defined. It is noted that a thickness of the bottom portion 44 and a height of the wall portion 46 can be appropriately selected depending on the application of the lead 36. In FIG. 4, the thickness and the height of the lead are not the same as those in FIG. 3. In the embodiment shown in FIG. 4, the lead 36 as a whole has the concave potion 48, but in other embodiment, the lead may be a plate-form lead a portion of which has a concave portion 48. It is noted that as the lead 36, a lead which is obtained, for example, by subjecting a metal plate having a thickness of for example 0.15 mm to 0.5 mm to a drawing process. In this case, the thickness of the bottom portion 44 which defines the concave portion 48 is, for example, about 0.13 mm to 0.48 mm. Generally, the thickness of the bottom portion 44 is more preferably 0.25 mm to 0.43 mm, and particularly preferably 0.37 mm to 0.39 mm.

In the PTC device, the lead 36, particularly its bottom portion 44 is located adjacently to the metal electrode 42 of the PTC member, and there is an electrically conductive connection 50 between them. That is, the lead 36 is electrically connected to the metal electrode 42 through the electrically conductive connection portion 50. The other lead 34 is located adjacently to the metal electrode 40 of the PTC member, and there is an electrically conductive connection portion 50 between them. That is, the lead 34 is electrically connected to the metal electrode 40 via the electrically conductive connection portion 50. It is noted that the other lead 34 may have portions 35 which extend outward from the both end sides of the lead 34 (therefore, outward from and below the both end sides of the lead 36) as shown with broken lines in FIG. 2. In a further embodiment, only one end side may have a portion which extends outward from the end side of the lead 34 shown with a solid line. In the embodiments in which the lead 34 extends outward, this extending portion may be used for welding the PTC device according to the present invention to other electric element (such as an electric apparatus, a lead, a pad or the like).

In the illustrated embodiment, the wall portion 46 of the lead 36 surrounds a side of the electrically conductive connection portion 50 which connects the lead 36 to the metal electrode 42. In the illustrated embodiment, the wall portion 46 additionally surrounds a side of the metal electrode 42 and a side of an upper portion of the PTC element 38 in addition to the side of the electrically conductive connection portion 50. Such additionally surrounding is particularly preferable, but surrounding at least the side of the electrically conductive connection portion 50 is preferable.

Figure 5:
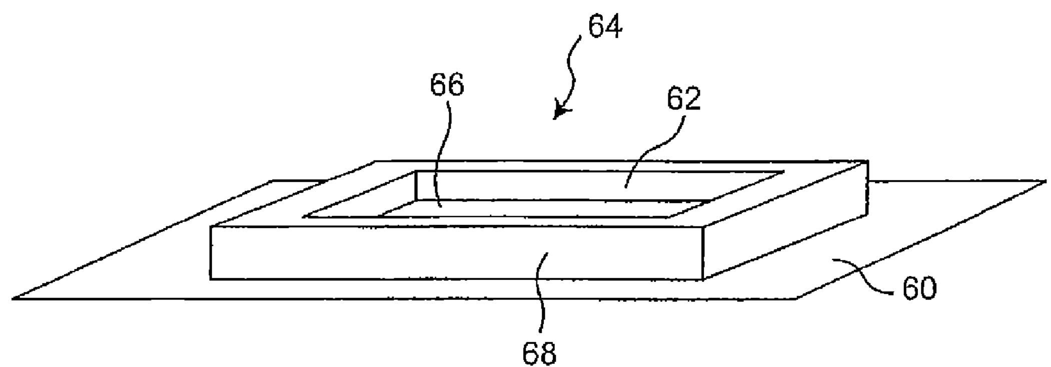
FIG. 5 schematically shows a jig 64 in a perspective view which is used in the production of the PTC device.

When the PTC device shown in FIG. 2 is produced, for example a jig 64 having a concave portion 62 on a plate 60 as shown in FIG. 5 is used. The lead 36 is first placed on a bottom portion 66 of the concave portion 62 of the jig, and a solder paste (namely, corresponding to a precursor of the electrically conductive connection portion) 50 is supplied onto the lead 36. The PTC member 32 is placed on the solder paste, other solder paste 50 is supplied onto the metal electrode 40 of the PTC member, and finally the substrate side lead 34 is placed on the solder paste so that an assembly of these members is formed within the concave portion 62 of the jig 64. Preferably, the assembly and the concave portion of the jig are constructed such that thus formed assembly fills substantially a whole of the space within the concave portion 62 of the jig 64 (that is, such that the assembly is just fitted into the concave portion of the jig). The jig 64 having the assembly in its concave portions 62 is heated in a reflow furnace so as to melt the solder paste followed by solidifying, thereby the PTC device is obtained wherein the assembly is bonded together. It is noted that portions 52 and 54 are schematically shown in FIG. 2 wherein the portions are formed with a portion of molten solder paste which protruded out followed by solidifying.

As readily seen, the protruding portion 52 cannot move any more outward on the side of the lead 36 by means of the wall portion 46, so that it does not spread out outward excessively. Therefore, the protruding portion 52 does not adhere to the wall portion 68 which defines the concave portion 62 as a cavity of the jig. Therefore, effects are provided, which solve the problem of difficulty of removing the PTC device from the jig due to the protruding portion 52, and also the problem of requirement of cleaning of the jig induced by the adhesion of the solder paste to the wall portion 68.

On the other hand, since the lead 34 does not have a wall portion, there is a likelihood in which the protruding portion 54 spreads further outward. In that case, the protruding portion may adhere to the wall portion 68 which defines the cavity 62 of the jig 64 depending on an amount of the solder paste, a heating condition and the like if it spreads excessively outward. In this case, it becomes difficult to take the PTC device out of the jig. In addition, the solder paste remains adhering to the wall portion 68, and therefore the jig cleaning becomes required.

It is noted that in the illustrated embodiment, the wall portion 68 of the concave portion which the jig 64 defines may not necessarily be present over a whole periphery of the concave potion 62, and the wall portion may be a portion of a wall which is present over the whole periphery of the concave potion, for example, the wall portion 68 may be present at only four corners of the concave portion.

The PTC device shown in FIG. 2 further comprises an oxygen barrier layer 47 on the side of the PTC member. The oxygen barrier layer 47 is present at least on the side of the PTC element 38, and prevents an electrically conductive filler (for example, nickel filler) contained in the PTC element from being oxidized. When the oxidation of the electrically conductive filler does not have to be cared, for example, in the case wherein carbon filler is used, no oxygen barrier layer has to be provided.

When the oxygen barrier layer is provided, an epoxy resin is supplied to a side of an assembly of which connection has been done in the reflow furnace as described above with keeping such assembly in an appropriate jig, followed by solidifying (or curing) the epoxy resin so as to form the oxygen barrier layer 47. As seen from FIG. 2, when the epoxy resin is supplied to the side of the assembly, the epoxy resin is prevented from overflowing to the outside by the wall portion 46 of the lead 36 even though an amount of the supplied resin is excessively large. Therefore, the adhesion of the outflowed epoxy resin to the jig is prevented. Therefore, an effect is provided, which frequency of cleaning of the jig due to the adhering of the epoxy resin is greatly reduced.

Figure 3:
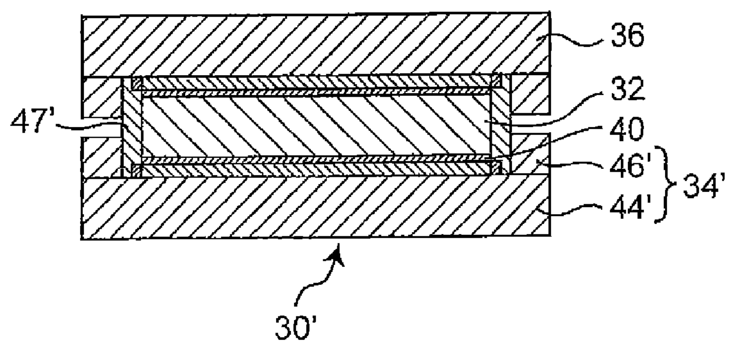
FIG. 3 schematically shows a configuration of other embodiment of a PTC device according to the present invention in its cross-sectional view.
Figure 4:
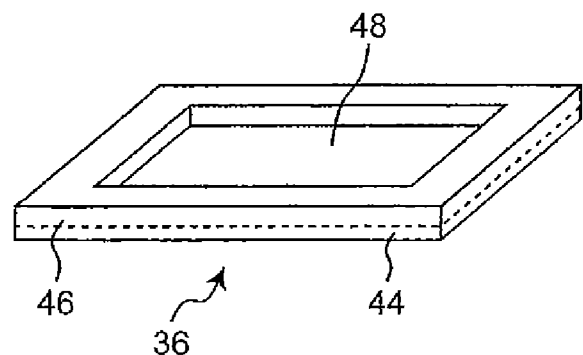
FIG. 4 schematically shows a lead of the PTC device shown in FIG. 2 in a perspective view while it is inverted upside down from the condition shown in FIG. 2.

Similarly to FIG. 2, other embodiment of the PTC device 30' according to the present invention is schematically shown in FIG. 3. The illustrated embodiment is substantially the same as the embodiment shown in FIG. 2 except that the cell side lead 34' also has a concave portion which is defined by a bottom portion 44' which is located adjacently to the metal electrode 40 of the PTC member 32 and a wall portion 46' which surrounds a periphery of a side of the electrically conductive connection portion 50 which connects the lead to the metal electrode. In the PTC device 30' shown in FIG. 3, since the substrate side lead also has the wall portion 46', the effects which are provided by having wall portion 46 are similarly provided by the wall portion 46' of the substrate side lead 34'. It is noted that, as seen from FIG. 3, the oxygen barrier layer 47' is provided with being prevented from outflowing to outside of the PTC device 30'.

Figure 6:
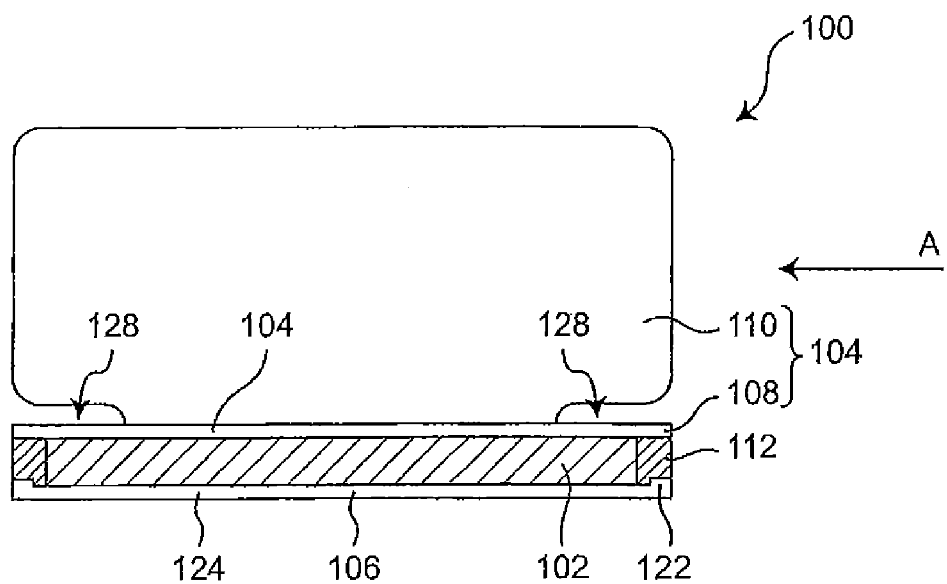
FIG. 6 schematically shows a configuration of one embodiment of a PTC device according to the present invention in its cross-sectional view.

Similarly to FIG. 2, one of preferable embodiments of the PTC device according to the present invention is shown in FIG. 6 as a schematic cross-sectional view. In the illustrated embodiment, the PTC device 100 comprises a PTC member 102 and leads 104 and 106 which are electrically connected to the both sides of the PTC member. It is noted that the PTC member 102 comprises a PTC element and metal electrodes (preferably metal foil electrodes) which are placed on the both sides of the PTC element similarly to the above described embodiments, but these are shown in an integrated manner as the PTC member 102.

One lead 106 provided on the lower side of the PTC member 102 is a lead having a concave portion similarly to the above described cell side lead 36, and it may be, for example, a drawing processed lead. The other lead 104 provided on the upper side of the PTC member 102 is a lead which is also a so-called an L-shaped lead. An oxygen barrier layer 112 is provided around the PTC member 102 sandwiched by such leads similarly to the embodiment of FIG. 2 or FIG. 3, so that an exposed side surface of the PTC member is covered by the barrier layer.

The L-shaped lead has a character L shape when the lead is watched from its side, and a horizontal portion 108 of the L-shaped lead is electrically connected to the metal electrode on the upper side of the PTC member 102. Such connection may be carried out in any appropriate manner as long as both of electric connection and bond to the PTC member are achieved. For example, welding (for example, resistance welding), soldering, connecting with an electrically conductive adhesive or an electrically conductive paste or the like may be employed. It is noted that the L-shaped lead 104 has a vertical portion 110 of the L-shaped lead which forms an angle of 90 degrees with respect to the horizontal portion 108, and these portions together form the L-shaped lead 104.

By providing such L-shaped lead as described above, when the PTC device is electrically connected to other electric element (for example, a wiring on a substrate, a pad, a land, an element, other lead or the like) is formed, an electric connection may be formed between the vertical portion 110 and the other electric element. Therefore, high temperature heat applied when the electric connection is formed (for example, heat by means of heating upon connecting with soldering, welding, an electrically conductive adhesive or the like) is supplied to the vertical portion 110 and it is not directly supplied to the horizontal portion 108.

As a result, the high temperature heat supplied to the vertical portion is also transferred to the horizontal portion 108 with dissipating to various directions. That is, an amount of heat which is transferred to the horizontal portion 108 is reduced, and temperatures of the horizontal portion 108, and thus the PTC member 102 located under the portion 108 and the electrically conductive connection portion (not shown in FIG. 7, a portion corresponding to the portion 50 in FIG. 2), and the oxygen barrier layer (if any) are not so raised to a temperature of the vertical portion. Thereby, it is convenient that transferring a high temperature applied to the PTC member, particularly to the PTC element when the PTC device is connected to the electric element can be suppressed.

Figure 7:
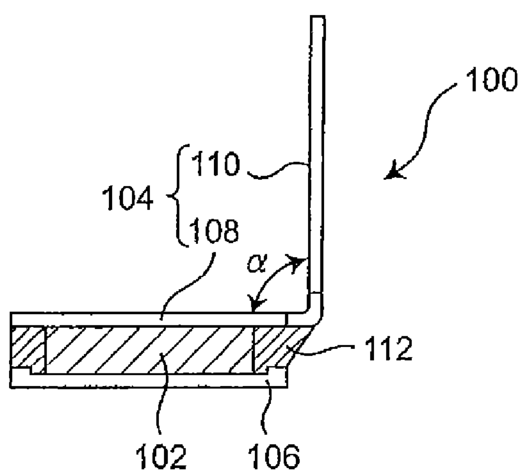
FIG. 7 schematically shows a side cross-sectional view of the PTC device shown in FIG. 6 for the purpose of easy understanding of the shape of an L-shaped lead.

For readily understanding the shape of the L-shaped lead, it is noted that a cross-sectional view of the PTC device is schematically shown in FIG. 7 when the PTC device is watched in a direction along an arrow A as shown in FIG. 6 (corresponding to a schematically side end elevation view of the PTC device in FIG. 6). As seen easily, the L-shaped lead has the horizontal portion 108 and the vertical portion 110, and the angle $\alpha$ which is formed by those portions is substantially 90° in the illustrated embodiment. However, this angle $\alpha$ may be any appropriate angle. For example, it may be 45° to 135°. It is preferably 60° to 120°, and more preferably 80° to 100°, and most preferably 90°. In the sense of allowing such angle ranges, it may be practical that a "non-horizontal portion" is used in place of the "vertical portion".

Figure 8:
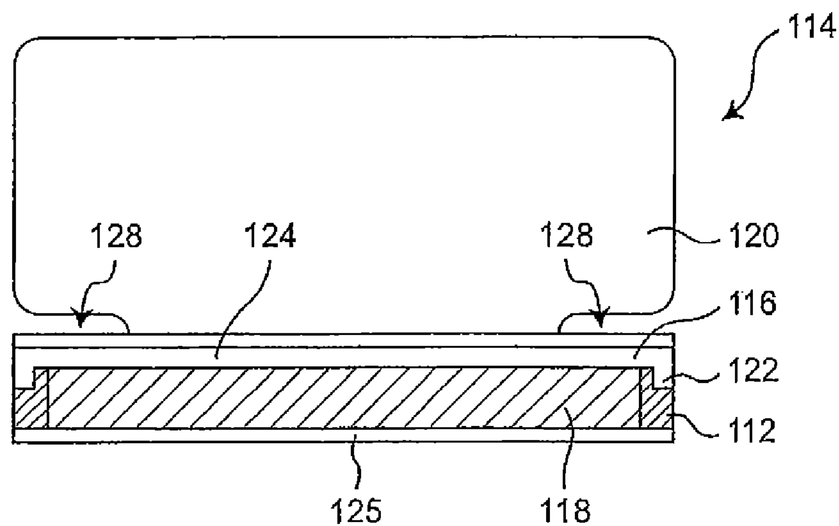
FIG. 8 schematically shows a configuration of one embodiment of a PTC device according to the present invention in its cross-sectional view.
Figure 9:
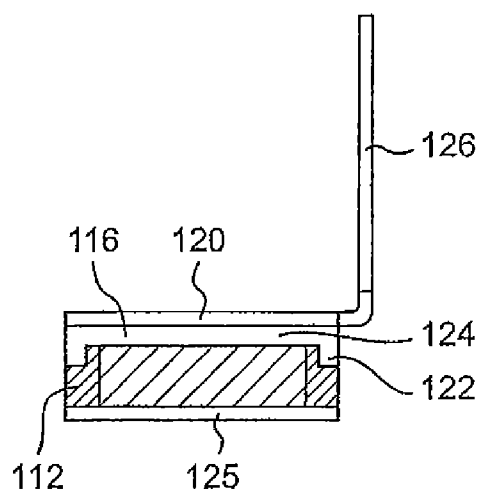
FIG. 9 schematically shows a side cross-sectional view of the PTC device shown in FIG. 8 for the purpose of easy understanding of the form of the L-shaped lead in the same way as FIG. 7.

A further preferable embodiment of the PTC device according to the present invention which comprises an L-shaped lead is shown in FIG. 8 similarly to FIG. 6. In this embodiment, the PTC device 114 comprises a lead 116 having a concave portion via an electrically conductive connection (not shown) on a PTC member 118. This lead 116 is similar to that explained before, and it is, for example, a drawing processed lead. In the illustrated embodiment, an L-shaped lead 120 which is substantially similar to the above described L-shaped lead is electrically connected onto the lead 116. The connection between those leads may be carried out in any appropriate manner. For example, welding, soldering, connecting with an electrically conductive adhesive or the like may be used for carrying out connecting. It is noted that in the illustrated embodiment, the lead 116 and the lead 120 which are separate members are connected together, but those leads may be originally an integrated single member. For example, an L-shaped lead having a concave portion may be formed by pressing or drawing a metal sheet for producing a lead to form a wall portion 122 and a bottom portion 124 of the concave portion on a portion of the sheet, and folding, with respect to said portion including the concave portion of the sheet, the other portion of the metal sheet. In this case, the portion which includes the concave portion corresponds to the horizontal portion (116+120), and the other portion which is folded corresponds to the vertical portion or the non-horizontal portion 126. It is noted that the lead 125 on the lower side of the PTC member 118 is shown as a conventional flat lead in the illustrated embodiment.

In the PTC device according to the present invention, since the lead having the concave portion is used, the problem as to the solder paste protrusion can be suppressed as described above. As shown in FIG. 6 and FIG. 8, when one of the leads of the PTC device is the L-shaped lead, high temperature which would be applied to the lead 36 corresponding to the horizontal portion if the PTC device as shown in FIG. 2 or FIG. 3 is used is prevented from being directly conducted to the PTC member and its surroundings when the PTC device is connected to other electric element. As a result, adverse effects of the high temperature can be suppressed which are provided to the PTC element as well as the oxygen barrier layer 112 and the electrically conductive connection portion (not shown in FIG. 7, a portion corresponding to the portion 50 in FIG. 2) around the PTC element.

For example, in the PTC device as shown in FIG. 6 or FIG. 8, even when high temperature is applied to the vertical portion 110 or 126, a possibility that the high temperature is transferred to the electrically conductive connection portion, and solder therein is re-melted and protrudes out can be reduced. In addition, even though a small amount of solder protrudes out, it is advantageous in that the protruded solder may be prevented from getting over the wall portion 122 which forms the concave portion by using the L-shaped lead as a lead having the concave portion. It is noted that in the illustrated embodiment with the L-shaped lead, one lead which is provided on the PTC member is the L-shaped lead, while the both of the leads on the PTC member may be the L-shaped leads when necessary, and also only one lead may have the concave portion, while each of the leads may have the concave portion.

As readily seen, the above mentioned advantage is provided by using the L-shaped lead and combining it with the lead having the concave portion according to the present invention. Even though the L-shaped lead is used and is combined with a PTC device in which no lead having the concave portion is used, it is advantage in that the high temperature effect can be avoided as much as possible. In addition, by employing the L-shaped form, since an area occupied by the lead can be smaller, there is an advantage in that a size of an electric or electronic apparatus in which the PTC device is comprised can be compact.

Further, by folding the vertical portion 110 and placing it on the horizontal portion 108 after the PTC device, for example, the right side of the vertical portion 110 is connected to the other electric element, other electric element can be located over the PTC device, and this is advantage in that the electric or electronic apparatus can be compact.

As readily seen, the advantage of moderating the adverse effect which is provided by the high temperature when the PTC device is connected to the other electric element can be enjoyed by using the L-shaped lead for the lead in any PTC device having a lead.

Therefore, in the third aspect, the present invention provides a new PTC device comprising a PTC member and a lead which is electrically connected to at least one of main surfaces of both sides of the PTC member (i.e. a lead which is electrically connected to one main surface of the PTC member, or two leads each of which is electrically connected to each of main surfaces, respectively), characterized in that the PTC member comprises a PTC element (preferably, a laminar PTC element) and metal electrodes (preferably, metal foil electrodes) placed on both sides of the PTC element, the lead is electrically connected to each metal electrode of the PTC member via an electrically conductive connection, and at least one lead is the above mentioned L-shaped lead.

In the broadest meaning of the PTC device according to the third aspect, features other than the L-shaped lead provided on at least one of the main surfaces of the PTC member is not particularly limited. In this sense, in the PTC device of the third aspect, the PTC member may be of any appropriate kind, for example, no lead is provided on the other main surface of the PTC member, and the metal electrode placed on the PTC element may be exposed.

In other embodiment of the PTC device of the third aspect, the main surfaces of the both sides of the PTC member have the leads, in this case, the L-shaped lead is provided on one surface while a flat lead is provided on the other surface. In other words, the PTC device of this embodiment comprises the PTC member and the leads provided on its both sides, and at least one lead is the L-shaped lead or comprises the L-shaped lead. The term "comprises the L-shaped lead" corresponds to an embodiment wherein the L-shaped lead is bonded to a flat lead so that they form an integrated lead as described below.

In the above mentioned PTC device of the third aspect, the features of the PTC device of the above mentioned first aspect according to the present invention are applicable excepting a feature that the PTC member comprises a lead on at least one of the main surfaces and a feature that such lead is the L-shaped lead. Therefore, since for example, the PTC member, the oxygen barrier layer, the electrically conductive connection portion and the like are already known, their explanations are omitted.

As to the above mentioned PTC device of the third aspect, in one preferable embodiment, a surface which is exposed because of no provision of a lead is covered by the above mentioned oxygen barrier layer. However, in the PTC device of the third aspect, when oxidation of an electrically conductive filler contained in the PTC element is not a problem or negligible, the oxygen barrier layer may be excluded. For example, when carbon black or TiC is used as the electrically conductive filler, the oxygen barrier layer may be omitted.

As to the above mentioned PTC device of the third aspect, in a further preferable embodiment, at least one lead may be the above mentioned lead having the concave portion, and the L-shaped lead may be integrated with the lead having the concave portion or may be an L-shaped lead which is connected (or bonded) to the lead having the concave portion placed on the PTC member. Therefore, the both of the leads may those which have the concave portions. In a further preferable embodiment of the PTC device of the third aspect, the both of the leads provided on the both side of the PTC member may be the L-shaped leads.

The L-shaped lead which the PTC device of the third aspect as described above is preferably formed such that a surface which defines the horizontal portion and a surface which defines the vertical portion form a specific angle $\alpha$ as described above, and it is also preferable that the vertical portion can be folded onto the horizontal portion. It is noted that the L-shaped lead may basically be a structure which is formed by folding a rectangular sheet to form a specific angle (for example, 90°), and it may have a cutout portion 128 which makes folding to form the L-shape and folding after connecting to the other electric element easy, and the cutout portion may be provided at any appropriate location on a border area (for example, both ends of the border area, or in-between them) between the horizontal portion and the vertical portion as shown.

CROSS-REFERENCE TO RELATED APPLICATIONS

This application claims priorities to and the benefit of Japanese Patent Application No. 2011-103107, filed on May 2, 2011 and titled as "PTC Device", and Japanese Patent Application No. 2011-197370, filed on Sep. 9, 2011 and titled as "PTC Device", the entire contents of which are incorporated herein by reference.

The element reference numbers are:

10—PTC device, 12—PTC member,
14—substrate side lead, 16—cell side lead,
18—PTC element, 20—metal electrode,
22—metal electrode,
24—electrically conductive connection,
26—oxygen barrier layer, 28—protruding portion,
30—PTC device, 32—PTC member,
34—substrate side lead, 35—extending portion,
36—cell side lead, 38—PTC element,

The invention claimed is:

1. A PTC device which comprises a PTC member and leads electrically connected to both sides of the PTC member, characterized in that the PTC member comprises a PTC element and metal electrodes placed on both sides of the PTC element respectively, each lead is electrically connected to the metal electrode respectively via an electrically conductive connection portion, and at least one of the leads has a concave portion which is defined with a bottom portion located adjacently to the metal electrode of the PTC member and a wall portion surrounding the electrically conductive connection portion which connects the leads to the metal electrode.

2. The PTC device according to claim 1 which is characterized in that an exposed side portion of the PTC element which constructs the PTC member is covered by an oxygen barrier layer.

3. A PTC device which comprises a PTC member and leads electrically connected to both sides of the PTC member, characterized in that:

the PTC member comprises a PTC element and metal electrodes placed on both sides of the PTC element respectively, each lead is electrically connected to the metal electrode respectively via an electrically conductive connection portion, at least one of the leads has a concave portion which is defined with a bottom portion located adjacently to the metal electrode of the PTC member and a wall portion surrounding the electrically conductive connection portion which connects the leads to the metal electrode, and the lead having the concave portion is a drawing processed lead or a pressing processed lead.

4. An electric apparatus which comprises a PTC device comprising a PTC member and leads electrically connected to both sides of the PTC member, said PTC device characterized in that:

the PTC member comprises a PTC element and metal electrodes placed on both sides of the PTC element respectively, each lead is electrically connected to the metal electrode respectively via an electrically conductive connection portion, at least one of the leads has a concave portion which is defined with a bottom portion located adjacently to the metal electrode of the PTC member and a wall portion surrounding the electrically conductive connection portion which connects the leads to the metal electrode, and the lead having the concave portion is a drawing processed lead or a pressing processed lead.

5. The electric apparatus according to claim 4 which is characterized in that an exposed side portion of the PTC element which constructs the PTC member is covered by an oxygen barrier layer.

6. A PTC device which comprises a PTC member and leads electrically connected to both sides of the PTC member, characterized in that the PTC member comprises a PTC element and metal electrodes placed on both sides of the PTC element respectively, each lead is electrically connected to the metal electrode respectively via an electrically conductive connection portion, and at least one of the leads is an L-shaped lead.

7. The PTC device according to claim 6 which is characterized in that the L-shaped lead further has a concave portion, and the metal electrode and a portion of the PTC element which is adjacent to the metal electrode are fitted into the concave portion.

8. The PTC device according to claim 7 which is characterized in that the L-shaped lead have a horizontal portion and a vertical portion, and the horizontal portion is placed on the PTC member, and the vertical portion extends in a direction away from the PTC member.

9. A PTC device according to claim 7 wherein the L-shaped lead is a drawing processed lead or a pressing processed lead.

10. The PTC device according to claim 6 which is characterized in that the L-shaped lead has a horizontal portion and a vertical portion, and the horizontal portion is placed on the PTC member, and the vertical portion extends in a direction away from the PTC member.

11. The PTC device according to claim 10 which is characterized in that the horizontal portion and the vertical portion form an angle between 45° and 135°.

12. A PTC device which comprises a PTC member and leads electrically connected to both sides of the PTC member, characterized in that:

the PTC member comprises a PTC element and metal electrodes placed on both sides of the PTC element respectively, each lead is electrically connected to the metal electrode respectively via an electrically conductive connection portion, at least one of the leads has a concave portion which is defined with a bottom portion located adjacently to the metal electrode of the PTC member and a wall portion surrounding the electrically conductive connection portion which connects the leads to the metal electrode, an exposed side portion of the PTC element which constructs the PTC member is covered by an oxygen barrier layer, and the lead having the concave portion is a drawing processed lead or a pressing processed lead.

13. An electric apparatus which comprises a PTC device comprising a PTC member and leads electrically connected to both sides of the PTC member, said PTC device characterized in that:

the PTC member comprises a PTC element and metal electrodes placed on both sides of the PTC element respectively, each lead is electrically connected to the metal electrode respectively via an electrically conductive connection portion, at least one of the leads has a concave portion which is defined with a bottom portion located adjacently to the metal electrode of the PTC member and a wall portion surrounding the electrically conductive connection portion which connects the leads to the metal electrode, and the lead having the concave portion is a drawing processed lead or a pressing processed lead.

* * * * *